Dec. 8, 1970 L. W. CAMPBELL, JR 3,546,588
PHASE HIT MONITOR-COUNTER
Filed Sept. 17, 1968 3 Sheets-Sheet 1

INVENTOR
L. W. CAMPBELL JR.
BY Roy M. Porter Jr.
ATTORNEY

Dec. 8, 1970 L. W. CAMPBELL, JR 3,546,588

PHASE HIT MONITOR-COUNTER

Filed Sept. 17, 1968 3 Sheets-Sheet 2

3,546,588
PHASE HIT MONITOR-COUNTER

Loran W. Campbell, Jr., Colts Neck, N.J., assignor to Bell Telephone Laboratories, Incorporated, Murray Hill and Berkeley Heights, N.J., a corporation of New York
Filed Sept. 17, 1968, Ser. No. 760,186
Int. Cl. H04l 1/00
U.S. Cl. 325—42 11 Claims

ABSTRACT OF THE DISCLOSURE

A survey and trouble-shooting instrument monitors a test tone transmitted on a voiceband data transmission path and detects phase hits and phase jitter which would adversely affect data transmission on the path. A phase locked loop is used to phase-synchronize an internally produced signal with the tone. Comparison of the tone and internal signal produces an indication of a rapid phase variation of the tone. The indication, if of a selected magnitude and duration, is recorded as a hit. The internal signal is adjusted to the substantially identical frequency of the tone to avoid erroneous indications of phase hits due to frequency differences between the tone and the signal. Phase jitter is constantly indicated by monitoring the phase locked loop error signal.

BACKGROUND OF THE INVENTION

This invention relates to test and monitoring equipment for communication networks and, more particularly, to phase hit indicators for voiceband long lines.

In recent years there has been much concern over the effect of sudden momentary disturbances on various transmission systems. The disturbances, commonly called "hits," if of sufficient magnitude and duration can be a source of serious impairment of telegraph and data transmission.

In general, there are three basic causes of interference or variation in the transmission path which will adversely affect data transmission. The first is a level change and in effect is an amplitude transient on the carrier. The effect of this type of variation is dependent on its magnitude, duration and time of occurrence relative to the transmitted signal. It is independent of the applied signal level. The second type of variation is a phase change which corresponds to modulation in an FM system. In addition, a phase change may produce an amplitude change which is directly proportional to the magnitude of the phase change. Thus, a phase change could produce a disturbance on both AM and FM systems. A third disturbance is classified as impulse noise. The effect of noise of a certain magnitude on a system is dependent on the applied signal level and the exact time of occurrence relative to the signal being transmitted.

Interest in controlling these variations has paralleled the growth of data circuits. It is desirable to be able to test sample data channels and obtain statistical information regarding interference, and to be able to monitor operating data transmission paths to determine when a severe variation has occurred. Presently there are instruments available to characterize gain hits, random noise and impulse noise but little has been available to verify system performance with respect to variations caused by phase changes which are referred to as phase hits.

A phase hit is defined by a rate of phase change, a magnitude of change, and a duration of change. The specific transmission path under test will determine the specific parameters which are required for a phase hit indication. A typical voiceband data transmission system might be impaired, for instance, by a phase shift changing at a rate of five degrees per millisecond, and accumulating to a total shift of ten degrees magnitude which is maintained for a duration of five milliseconds. Wider bandwidth transmission systems might suffer excessive error due to phase shifts accumulating at higher rates and maintained for shorter durations. Thus, a phase hit indication is desired when the appropriate values are exceeded. If, after the shift, the phase is maintained at a new offset, only one hit count is desired since only a phase shift relative to the new phase offset would adversely affect data transmission. Therefore, only a shift from that phase should give rise to another indication.

An obvious scheme for measuring phase shift is to continually compare the signal with a standard phase reference. This, of course, enables measurement of the magnitude of the phase shift but it does not discriminate between rates of change and durations of shift. Further, it is necessary to know the phase and frequency of the signal in order to establish the reference, and the reference must be readjusted after each step change of phase in order to prevent the unwanted multiple phase hit indications.

SUMMARY OF THE INVENTION

In accordance with the present invention, a phase hit monitor-counter is provided in which the instantaneous phase of a test tone placed on the transmission path to be tested is compared with the phase of an internally generated reference signal. The reference phase is synchronized with the average steady state phase of the received test signal by a phase locked loop. As used herein, phase synchronization means adjustment of the phases of two signals having the same frequency to a constant phase difference or offset. Thus, the reference is automatically readjusted to a new phase offset after any sustained phase change. This avoids multiple hit counts once the reference is established at the new offset. Since the reference phase is the average phase of the test signal the steady state system phase shift is irrelevant.

The phase locked loop further acts as a rate filter. If the rate of the phase change is too slow, the phase locked loop will compensate by causing the reference phase to change before a phase variation of a magnitude sufficient to trigger the detector is built up. If, on the other hand, the rate of change is faster, the phase locked loop compensation will not occur until after the detector has been triggered.

Those phase changes of sufficient rates are detected by comparing the reference phase with the received test signal. The input signal is converted to a square wave and the zero crossings are compared wtih those of a square wave reference 180 degrees out of phase. Phase comparison takes place in a simple AND gate. The width of the gate's output indicates the magnitude of the phase difference. If the magnitude is sufficient to trigger a threshold detector, a time weighting network determines whether the duration of the shift exceeds a minimum selected duration.

If the rate of change of a phase shift is fast enough to reach the detector without being compensated for by the phase locked loop, and the magnitude of the change exceeds a selected value, and a selected number of indications occur in a given duration, then a phase hit count will be produced, which may be recorded. The recording device is blanked after each count to allow the phase locked loop to readjust the reference, thus insuring that only one count will result from any single phase shift.

In addition to producing a count for each hit, the invention can be employed to monitor one representative transmission path in a group of similarly routed data paths and trigger an alarm, or initiate retransmission on the other paths when a hit occurs. Phase hits are likely to affect each path, and thus transmission errors due to hits can be avoided by duplicating all data transmissions which were in progress when a hit occurred.

The use of the phase locked loop also permits measurement of the test tone's phase jitter which is a low level angle modulation of the tone. The jitter exists in the error signal of the phase locked loop on an instantaneous basis though it is canceled in the steady state. A meter connected to monitor the instantaneous error signal will provide a continuous indication of phase jitter.

BRIEF DESCRIPTION OF THE DRAWINGS

In accordance with the invention.

DETAILED DESCRIPTION

Figure 1:
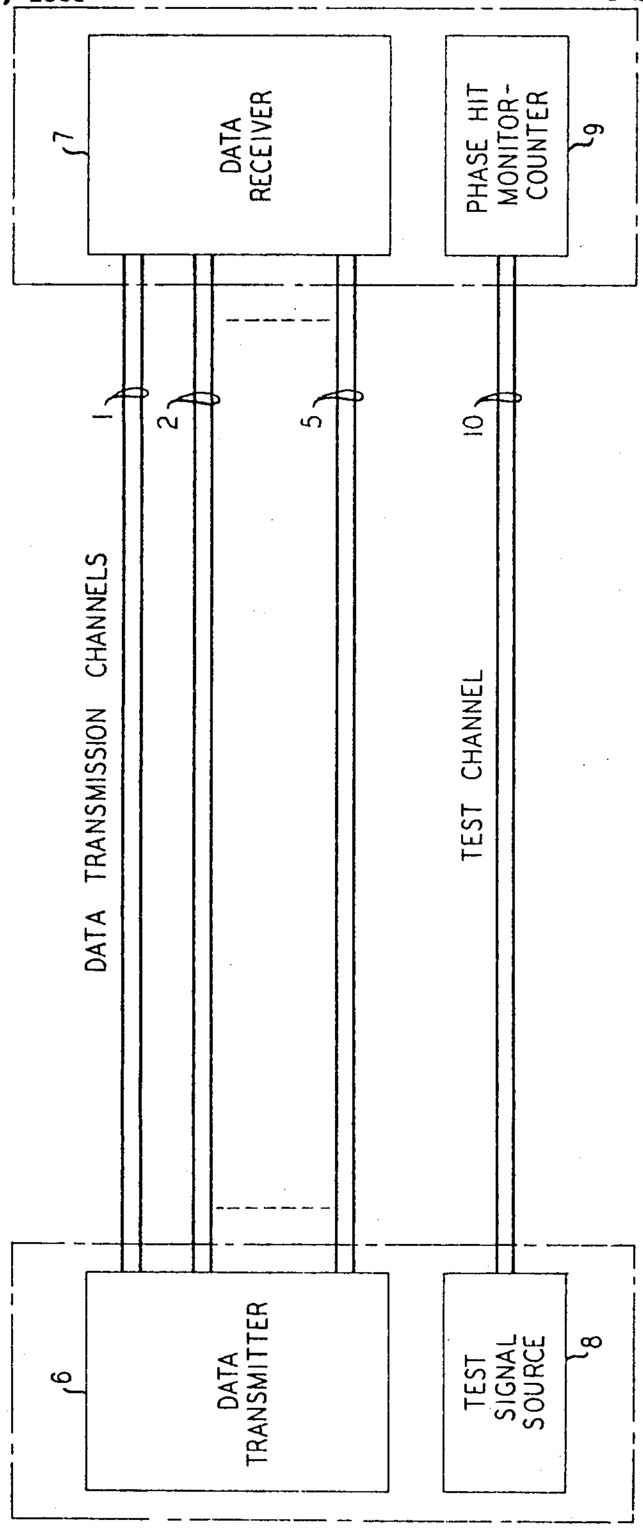
FIG. 1 is a block diagram of a data transmission system including a test channel path and a phase hit monitor-counter.

As illustrated in FIG. 1, phase hit monitor-counter 9 tests a voice frequency channel represented by transmission path 10 and detects phase variations which would impair data transmission on that channel. Test signal source 8, which may be any stable source generating a very low distortion sinusoidal audio frequency tone such as 1000 hertz, is coupled to one end of path 10. After transmission through path 10 the tone with transmission impairments is delivered to phase hit monitor-counter 9 at the opposite end of the path. (Monitor-counter 9 may also be employed on a loop-around basis.) A high signal level is selected to minimize the counter's susceptibility to random and impulse noise without excessively loading the transmission system.

The channel under test may be an individual audio channel which is removed from service for a phase hit test, or it may be a separate monitoring channel whose path 10 follows a route common to those of operating data transmission channels such as paths 1, 2 . . . 5. If path 10 is representative of paths 1, 2 . . . 5, then externally caused distortion occuring on path 10 can be expected to occur on the operating paths 1, 2 . . . 5, and information transmitted from data transmitter 6 to data receiver 7 via these channels will likely contain errors due to the distortion.

Monitor-counter 9 provides the means for detecting phase shifts on path 10 which will represent phase distortion of information received by receiver 7. Phase shifts exhibiting selected parameters can be detected and used to provide statistic characteristics of transmission quality, or to trigger an alarm or warning signal indicative of phase distortion. The warning signal could be used to control retransmission by transmitter 6, and such retransmission, instituted either manually or automatically in response to the warning signal, would preventatively eliminate possible error in the received data.

Operating paths 1, 2 . . . 5 may be paths of voiceband channels, in which case, path 10 may be only temporarily assigned as a test path, but operating paths 1, 2, . . . 5 could also be wideband channel paths and audio path 10 would then likely be a permanent monitoring path. Depending upon its application, monitor-counter 9 is provided with circuitry which gives phase hit indications when phase shifts of appropriate parameters occur. For monitoring wideband channels different parameters would be used than are used for obtaining statistical characteristics of voiceband channels.

Figure 2:
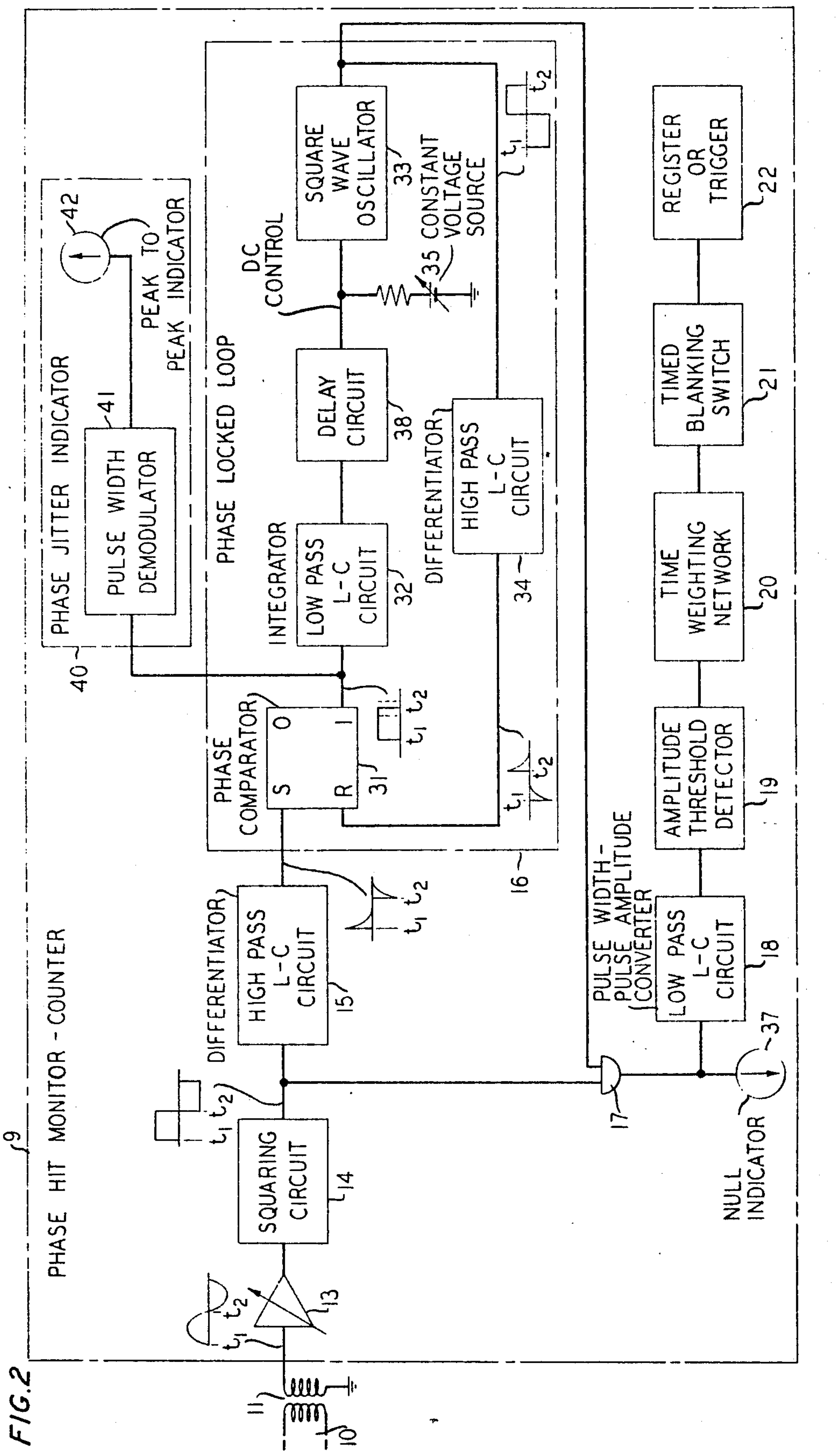
FIG. 2 is a block diagram of a phase hit monitor-counter.

As shown in FIG. 2, phase hit monitor-counter 9 is coupled to transmission path 10, which is illustrated as a balanced transmission line common in the art by transformer 11. Transformer 11 thereby provides conversion from the balanced system to the single-ended circuit of phase hit monitor-counter 9. Variable gain amplifier 13 is adjusted to provide a signal level within the limits of squaring circuit 14.

The sinusoidal test tone received from amplifier 13 is converted to an equivalent square wave at its zero crossings, designated $t_1$ and $t_2$ for the steady state condition without phase distortion, by squaring circuit 14 which is, for example, a conventional circuit comprising a limiter, amplifier and trigger. The square wave is delivered to a commonly known differentiator 15 such as a high pass LC circuit which produces a sharp positive output at the positive zero crossings $t_1$ of the test tone and a sharp negative output at its negative zero crossing $t_2$.

The differentiator outputs are fed to phase locked loop 16 which produces a square wave reference synchronized 180 degrees out of phase with the average phase of the square wave equivalent of the received signal. Phase locked loop 16 may be essentially a circuit of the type described in C. J. Byrne, "Properties and Design of the Phase-Controlled Oscillator With a Sawtooth Comparator," Bell System Technical Journal, March 1962, page 559. As will be discussed below, the phase locked loop disclosed in Byrne must be modified by the inclusion of a nominal frequency adjusting feature to insure accurate measurement of phase hits.

Voltage controlled square wave oscillator 33 generates a square wave which is used as a phase reference. The square wave has the same frequency as the test signal, when synchronized 180 degrees out of phase with the received test signal. The negative transition of the square wave occurs at $t_1$ and the positive transition occurs at $t_2$. The reference square wave from oscillator 33 is differentiated by differentiator 34 which may be a high pass LC circuit. Phase comparator 31 compares the differentiated input and reference signals which are well defined indications of zero crossings. Comparator 31 is a bistable multivibrator which is "set" by the negative output from differentiator 15 and is "reset" by the negative output from differentiator 34, and the output from comparator 31 is a periodic pulse train, the pulses of which are produced when multivibrator 31 is "reset." The duty cycle of the pulse train is fifty percent if there is exactly 180 degrees phase difference between the test and reference signals, and this fifty percent duty cycle output provides an unmodulated DC control which drives oscillator 33 at its nominal frequency. Any change of phase on the tone will cause an error indication which is manifested by a change in the duty cycle. The leading edge is defined by the output from differentiator 34 and is thus a relatively stable reference. The trailing edge of each pulse is defined by the negative output from differentiator 15 and is thus responsive to phase variations of the tone. The output train therefore exhibits a trailing edge type of pulse width modulation representative of the phase changes of the test signal.

The pulses from multivibrator 31 are integrated by integrator 32 which may be a low pass LC circuit, and when a phase variation has caused pulse width modulation the resultant amplitude modulated DC control signal controls the frequency of the output of square wave oscillator 33 to readjust the phase of the reference. The negative input at $t_2$ to phase locked loop 16 from differentiator 15 "sets" comparator 31 and the negative output at $t_1$ from voltage controlled oscillator 33 "resets" it, and thus the square wave output from oscillator 33 is re-established exactly 180 degrees out of phase with the steady state test signal without phase shift, when the nominal frequency of oscillator 33 is identical with the test frequency.

Any difference between the test and nominal oscillator frequencies will give rise to incorrect indications of phase shifts because there will be an added phase difference between the test signal and the oscillator signal in addition to the nominal 180-degree difference. Identity of the received test signal frequency and the nominal oscillator frequency must therefore be assured in order to avoid erroneous indications of phase hits. Adjustable constant voltage source 35 controls the nominal frequency of oscillator 33 by altering the oscillator's DC control bias. Adjustment of the nominal frequency by control of source 35 is monitored on null indicator 37. For identical frequencies and under conditions of no phase deviations, indicator 37 will read zero. In the presence of phase deviations indicator 37 will indicate a minimum when source 35 is properly adjusted. Source 35 is set initially and is not reset unless the test signal frequency is changed.

Phase locked loop 16 will compensate in a conventional manner for all phase shifts of the received tone by adjusting the frequency of the output of oscillator 33 to provide a new phase reference which is synchronized exactly out of phase with the shifted phase of the received test signal. The response time of phase locked loop 16 is determined by the delay of the loop, which is represented as a single lumped delay circuit 38 though delay is distributed throughout the loop and especially in circuit 32. The loop's response time can be controlled by appropriate alteration of circuit 38. The longer the delay, the more slowly loop 16 will respond to a phase shift, and therefore phase shifts of slower rates of change will reach detector 19. Loop 16 thus compensates for a selected rate of change of phase with sufficient rapidity so that no phase shift is indicated in succeeding sections of the counter for shifts of the selected rate and slower. Faster rates of change are not compensated for, however, until a sufficient shift has been accumulated to cause an indication. By varying delay circuit 38 phase locked loop 16 may be designed with any appropriate response time so that the counter can detect phase changes having rates of change designated by the user, and such rates may, of course, vary with different applications.

The characteristics of the type of phase locked loop disclosed above are used to advantage in two ways: first, the loop is stable for phase hits up to 180 degrees in magnitude, as opposed to a loop with a sinusoidal discriminator that is forced out of lock for phase hits between 90 degrees and 180 degrees in magnitude; second, the phase difference between the received test signal and the voltage controlled oscillator signal can be compared in a straightforward manner at AND gate 17 since the output of the voltage controlled oscillator is a square wave 180 degrees out of phase with the test square wave. The output of AND gate 17 is a pulse whose width is directly proportional to the magnitude of the phase shift. When the phase shift exceeds a selected threshold, as indicated by threshold detector 19, a signal is delivered to time weighting network 20 and then to register or trigger 22. If the phase shift is a step change, oscillator 33, under control of phase locked loop 16, will shift to the new input phase before register or trigger 22 accepts a second count.

The width of the output from AND gate 17 is exactly equal to the magnitude of the change of phase since the frequencies of the test signal and the nominal output of oscillator 33 are identical by virtue of adjustment of control 35. The pulse width modulation is converted to pulse amplitude modulation by conventional pulse width-to-pulse amplitude converter 18 which may be a low pass LC circuit, and the output is delivered to amplitude threshold detector 19 which is triggered by a selected amplitude threshold. For a 1000 Hertz tone, for instance, a ten-degree phase shift corresponds to a 27.8 microseconds pulse width and, if converter 18 and detector 19 are adjusted to appropriate values, an output from detector 19 will be generated indicating a ten degree shift when the width of the output pulse from gate 17 exceeds 27.8 microseconds. The response time of converter 18 or the threshold of detector 19 may be adjusted, as is obvious to one skilled in the art, and thus either may be adjusted to select the magnitude of phase shift required to give an indication.

Figure 3:
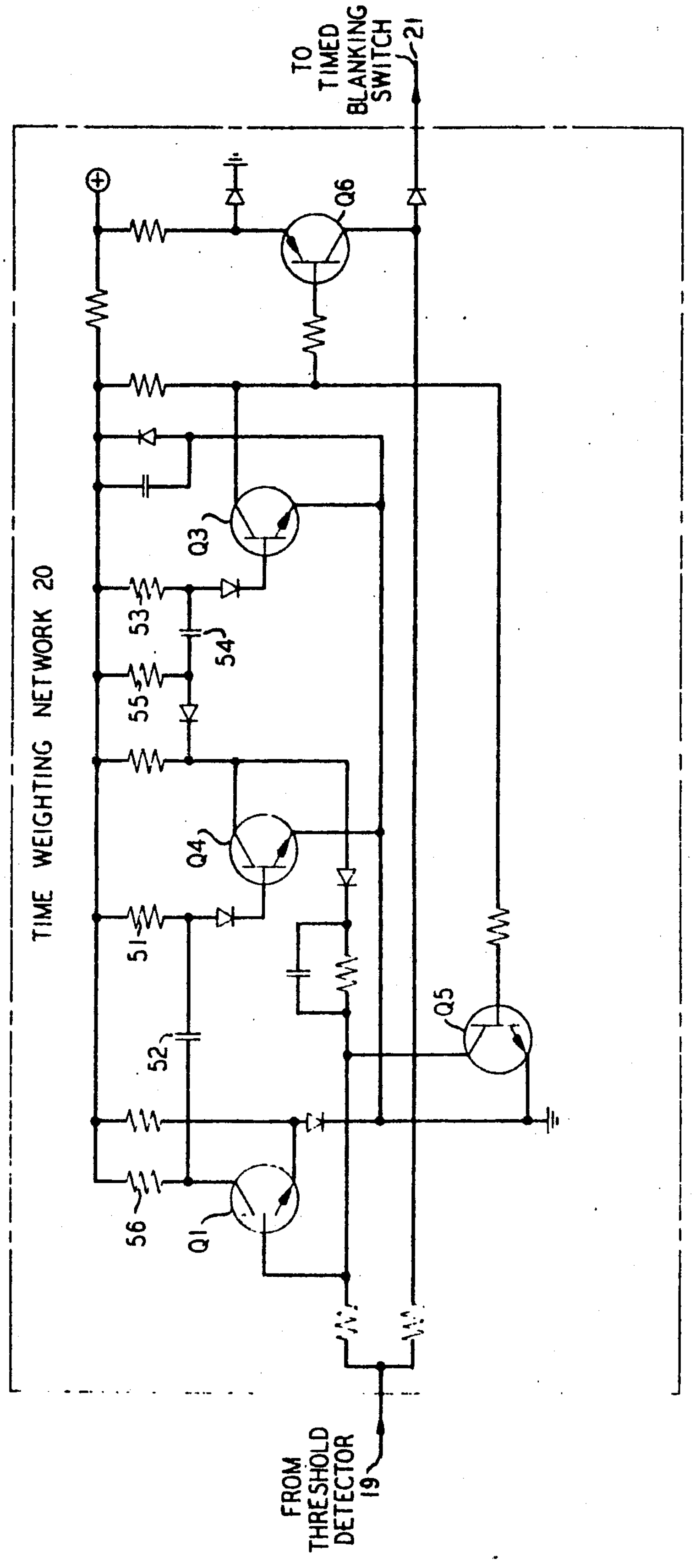
FIG. 3 is a schematic drawing of the time weighting network in FIG. 2.

The indication from detector 19 is fed to time weighting network 20. Network 20 passes an output only when an indication is sustained for a predetermined duration of time. The duration selected should be a compromise between the duration of the shortest signal element commonly used for data transmission in the system and the duration of impulse noise in such a system. The requirement that phase shifts last longer than the selected duration eliminates the effect of most impulse noise. FIG. 3 shows an example of network 20 in detail. Its function is to monitor the output of detector 19 which represents detected phase changes and to distinguish between short outputs due to noise and outputs of sufficient duration to be classified as actual phase hits.

Transistors Q1, Q4, and Q3 operate as two monostable multivibrators with transistor Q4 a common active element of each. Transistors Q5 and Q6 are controlled gates. Normally in the quiescent state transistor Q1 is OFF and transistors Q4 and Q3 are ON. Also, transistor Q5 is OFF and transistor Q6 is ON, and capacitor 52 is fully charged.

Assuming a phase hit has occurred, indication of phase shift will be delivered to network 20 once every cycle until phase locked loop 16 locks on the new phase. The first pulse will cause the multivibrator comprised of transistors Q1 and Q4 to go to its unstable state (i.e., transistor Q1 ON and transistor Q4 OFF). Capacitor 54 then fully charges through resistor 55, but the states of transistors Q3, Q5, and Q6 remain unchanged. Because transistor Q6 is ON, no pulses are present at the output. The circuit will remain in this state for a first time period determined by resistor 51 and capacitor 52. (The charging time of capacitor 54 should be substantially shorter than the first time period.) A 1.4 millisecond first time period is provided, for example, by a 225K ohm resistor 51 and a 10,000 picofarad capacitor 52.

At the end of this time, the multivibrator comprised of transistors Q1 and Q4 will go to its stable state (i.e., transistors Q1 OFF and Q4 ON), and the multivibrator comprised of transistors Q4 and Q3 will go to its unstable state (i.e., transistors Q4 ON and Q3 OFF). Also, capacitor 52 fully charges through resistor 56 returning to its quiescent state voltage. The high level at the collector of transistor Q3 also holds transistor Q5 ON and transistor Q6 OFF.

The circuit will remain in this state for a second time period determined by resistor 53 and capacitor 54. (The charging time of capacitor 52 should be substantially shorter than the second time period.) A 1.5 milliseconds second time period is provided by a 681K ohm resistor 53 and a 3,650-picofarad capacitor 54. During the second time period any pulses present at the input will not influence transistor Q1 since its base is shunted by ON transistor Q5, but pulses will be transmitted to the output since transistor Q6 is OFF. Thus, a phase shift indication must occur during the first time period and reoccur during the second time period in order for network 20 to produce an output. This accounts for a great deal of the hit counter's immunity to impulse noise.

Output from network 20 is fed to register or trigger 22 where it is appropriately utilized. Register 22, which may be conventional resettable message register with an appropriate driving circuit, could provide a permanent record of phase hits for statistical purposes. Trigger 22 could initiate an alarm or cause retransmission on transmission paths adjacent to path 10.

As mentioned above, after a phase change has occurred, phase locked loop 16 has a finite response time in which a new reference is established from the new steady state phase of the test signal. In order not to indicate a new hit each cycle due to the single shift, timed blanking switch 21 disables register or trigger 22 for a period of time sufficient to allow phase locked loop 16 to return the output of oscillator 33 to a 180-degree synchronization with the new phase of the test signal. Switch 21 causes an open circuit after each count and the circuit is maintained opened for a timed blanking period, sufficiently long to allow synchronization.

A useful modification of the invention is made when phase jitter indicator 40 is added. Indicator 40 responds to the zero crossings of the received test tone and indicates the frequency of peak-to-peak phase modulation by sampling the output pulse train from comparator 31. The variations in duty cycle from fifty percent indicate the instantaneous phase difference or error between the test and reference signals. This instantaneous difference represents the actual phase variation of the test signal, but phase jitter is not detected as hits because its level is insufficient to reach the threshold of detector 19. Pulse width demodulator 41, which includes a low pass filter and a peak-to-peak detector, separates the modulation or error indication from the pulse train. For best results, the filter should have significant attenuation for frequencies above one quarter the frequency of the test signal. The output of the detector in demodulator 41 appears on peak-to-peak indicator 42, which thus gives a constant indication of the phase jitter on the test signal.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In a multiple channel data transmission system a phase hit monitoring and counting network comprising:
   - a test channel path following a route common to the data channels in said system;
   - a first signal source at a first end of said test path introducing a test signal on said path at said first end;
   - a second signal source producing a reference signal;
   - synchronizing means for adjusting the phase of said reference signal to synchronization with the average phase of said test signal at a second end of said path in a preselected response time;
   - combining means for comparing the instantaneous phases of said test and reference signals and producing a difference indication representative of the phase difference between said test and reference signals;
   - detecting means for producing a shift indication when said phase difference indication exceeds a preselected magnitude;
   - said preselected response time being such that phase variations of said test signal below a preselected rate of change result in said synchronization being accomplished in a time sufficient that said difference indication is less than said preselected magnitude;
   - timing means for timing the duration of said phase difference indication and producing a duration indication when said phase difference indication is sustained for a preselected duration; and
   - utilization means responsive to the combined occurrence of said shift and said duration indications.

2. Apparatus for sensing and characterizing phase variations of a signal from a first point to a second point on a transmission path comprising:
   - a first signal source introducing a test signal on said path at said first point;
   - a second signal source producing a reference signal;
   - synchronizing means for adjusting the phase of said reference signal to synchronization with the average phase of said test signal at said second point in a preselected response time;
   - combining means for comparing the instantaneous phases of said test and reference signals and producing a difference indication representative of the phase difference between said test and reference signals;
   - detecting means for producing a shift indication when said phase difference indication exceeds a preselected magnitude;
   - said selected response time being such that phase variations of said test signal below a preselected rate of change result in said synchronization being accomplished in a time sufficient that said difference indication is less than said preselected magnitude;
   - timing means for timing the duration of said phase difference indication and producing a duration indication when said phase difference indication is sustained for a preselected duration; and
   - utilization means responsive to the combined occurrence of said shift and said duration indications.

3. Apparatus as claimed in claim 2 wherein said second signal source is a voltage controlled oscillator and said synchronizing means is a phase locked loop including means for sampling said reference signal from said voltage controlled oscillator and phase comparing means for comparing the phases of said sampled reference and said test signals and for producing a DC voltage for control of the frequency of said voltage controlled oscillator.

4. Apparatus as claimed in claim 3 wherein said phase locked loop has a preselected delay which determines the response time which is required to synchronize the phase of said reference signal with the phase of said test signal after said phase of said test signal has shifted.

5. Apparatus as claimed in claim 3 wherein said phase comparing means comprises differentiating means for differentiating said sampled reference signal and producing well-defined indications of the zero crossings of said sampled reference signal, differentiating means for differentiating said test signal and producing well-defined indications of the zero crossings of said test signal and a bistable multivibrator being set and reset by successive zero crossing indications of said sampled reference signal and said test signal, respectively.

6. Apparatus as claimed in claim 3 wherein means are provided for adjusting the bias of said voltage controlled oscillator for varying the nominal frequency of said voltage controlled oscillator to be substantially identical with the frequency of said test signal.

7. Apparatus as claimed in claim 2 wherein said test signal and said reference signal are synchronized 180 degrees out of phase by said synchronizing means.

8. Apparatus as claimed in claim 7 wherein said second signal source is a square wave oscillator and said reference signal is a square wave and wherein said test signal is converted to a square wave and wherein said combining means for combining said two square waves is an AND gate.

9. Apparatus as claimed in claim 3 wherein said phase comparing means includes a phase comparator for producing an error indication representative of the instantaneous phase difference between said test and reference signals, and wherein an indicator monitors said error indication.

10. Apparatus as claimed in claim 2 wherein said timing means comprises an input terminal, an output terminal, first and second monostable multivibrators, said first multivibrator being switched from an initial state to an unstable state exclusively by an input pulse and being sustained in said unstable state for a first preselected period, said second multivibrator being switched to an unstable state exclusively by the return of said first multivibrator to said initial state at the end of said first period for a second preselected period, and gating means from said input terminal to said output terminal being open exclusively during said second period, whereby an output is produced at said output terminal exclusively upon the consecutive occurrence of an input pulse during said first period and an input pulse during said second period.

11. A timing network comprising an input terminal, an output terminal, first and second monostable multivibrators, said first multivibrator being switched from an initial state to an unstable state exclusively by an input pulse and being sustained in said unstable state for a first preselected period, said second multivibrator being switched to an unstable state exclusively by the return of said first multivibrator to said initial state at the end of said first period for a second preselected period, and gating means from said input terminal to said output terminal being open exclusively during said second period, whereby an output is produced at said output terminal exclusively upon the consecutive occurrence of an input pulse during said first period and an input pulse during said second period.

References Cited

UNITED STATES PATENTS

| | | | |
|---|---|---|---|
| 3,378,771 | 4/1968 | Gerwen et al. | 325—42 |
| 3,462,687 | 8/1969 | Becker et al. | 325—331 |

ROBERT L. GRIFFIN, Primary Examiner

R. S. BELL, Assistant Examiner

U.S. Cl. X.R.

307—273; 325—67, 421; 328—207